(12) United States Patent
Hoe et al.

(10) Patent No.: US 7,021,887 B2
(45) Date of Patent: Apr. 4, 2006

(54) SINGULATOR FOR STACKED WORK PIECES

(75) Inventors: Shih Hsiung Hoe, Singapore (SG); Chit Hin Koh, Singapore (SG); Loke Peng Wong, Singapore (SG); Wang Yue, Singapore (SG); Chee Suan Low, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 302 days.

(21) Appl. No.: 10/186,148

(22) Filed: Jun. 28, 2002

(65) Prior Publication Data

US 2003/0105551 A1 Jun. 5, 2003

Related U.S. Application Data

(60) Provisional application No. 60/337,268, filed on Dec. 5, 2001.

(51) Int. Cl.
*B65G 59/02* (2006.01)

(52) U.S. Cl. .............. 414/796.6; 414/796.5; 414/796.9

(58) Field of Classification Search ............. 414/796.4, 414/796.5, 796.6, 796.9; 221/221
See application file for complete search history.

(56) References Cited

U.S. PATENT DOCUMENTS

| | | | | |
|---|---|---|---|---|
| 2,161,866 A * | 6/1939 | Huckins | ..... | 271/104 |
| 2,538,185 A * | 1/1951 | Anderson | ..... | 221/187 |
| 3,283,952 A * | 11/1966 | Burt | ..... | 221/13 |
| 3,283,955 A * | 11/1966 | Crabtree | ..... | 221/251 |
| 3,601,282 A * | 8/1971 | Vogel | ..... | 221/251 |
| 3,659,744 A * | 5/1972 | Byrd et al. | ..... | 221/1 |
| 3,701,440 A * | 10/1972 | Windstrup et al. | ..... | 414/795.6 |
| 3,985,265 A * | 10/1976 | Sauer | ..... | 221/221 |
| 4,270,669 A * | 6/1981 | Luke | ..... | 221/13 |
| 4,523,422 A | 6/1985 | Isemann | | |
| 4,586,318 A | 5/1986 | Litt et al. | | |
| 4,770,588 A * | 9/1988 | Ripatonda | ..... | 414/795.6 |
| 4,809,881 A * | 3/1989 | Becker | ..... | 221/224 |
| 4,909,412 A * | 3/1990 | Cerf | ..... | 221/1 |
| 4,922,689 A | 5/1990 | Haas et al. | | |
| 5,012,952 A * | 5/1991 | Franz | ..... | 221/36 |
| 5,024,048 A * | 6/1991 | Moore | ..... | 53/534 |
| 5,106,260 A * | 4/1992 | Obrecht | ..... | 414/796.6 |
| 5,163,271 A | 11/1992 | Pan et al. | | |
| 5,207,351 A * | 5/1993 | Lesar | ..... | 221/223 |
| 5,285,620 A | 2/1994 | Kaye et al. | | |
| 5,380,147 A * | 1/1995 | Hess et al. | ..... | 414/796 |
| 5,431,531 A * | 7/1995 | Nozawa | ..... | 414/796.6 |
| 5,692,878 A * | 12/1997 | Freund | ..... | 414/796.6 |
| 5,882,174 A | 3/1999 | Woerner et al. | | |
| 5,918,765 A * | 7/1999 | Blankenship et al. | ..... | 221/221 |
| 6,147,960 A * | 11/2000 | Wolfer et al. | ..... | 369/30.52 |
| 6,758,370 B1 * | 7/2004 | Cooke et al. | ..... | 221/194 |

* cited by examiner

*Primary Examiner*—Khoi H. Tran
(74) *Attorney, Agent, or Firm*—Fellers, Snider, et al.

(57) ABSTRACT

An apparatus and associated method for singulating a first work piece from a plurality of stacked work pieces, the plurality of stacked work pieces comprising a second work piece adjacent the first work piece. A stripping member is engageable against the second work piece. A lifting member is engageable with the first work piece and displaceable with respect to the stripping member between first and second positions. In the lifting member first position the first and second work pieces are stacked; in the lifting member second position the first and second work pieces are unstacked. After unstacking, a supporting member is moveable to engage the unstacked first work piece, selectively supporting the first work piece.

13 Claims, 4 Drawing Sheets

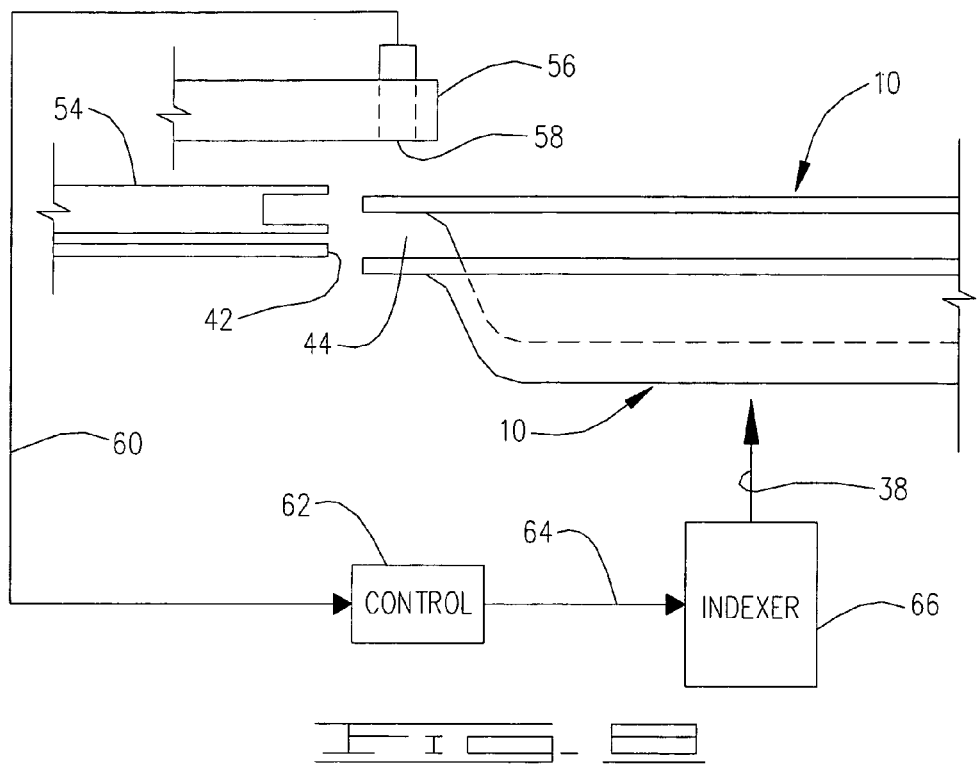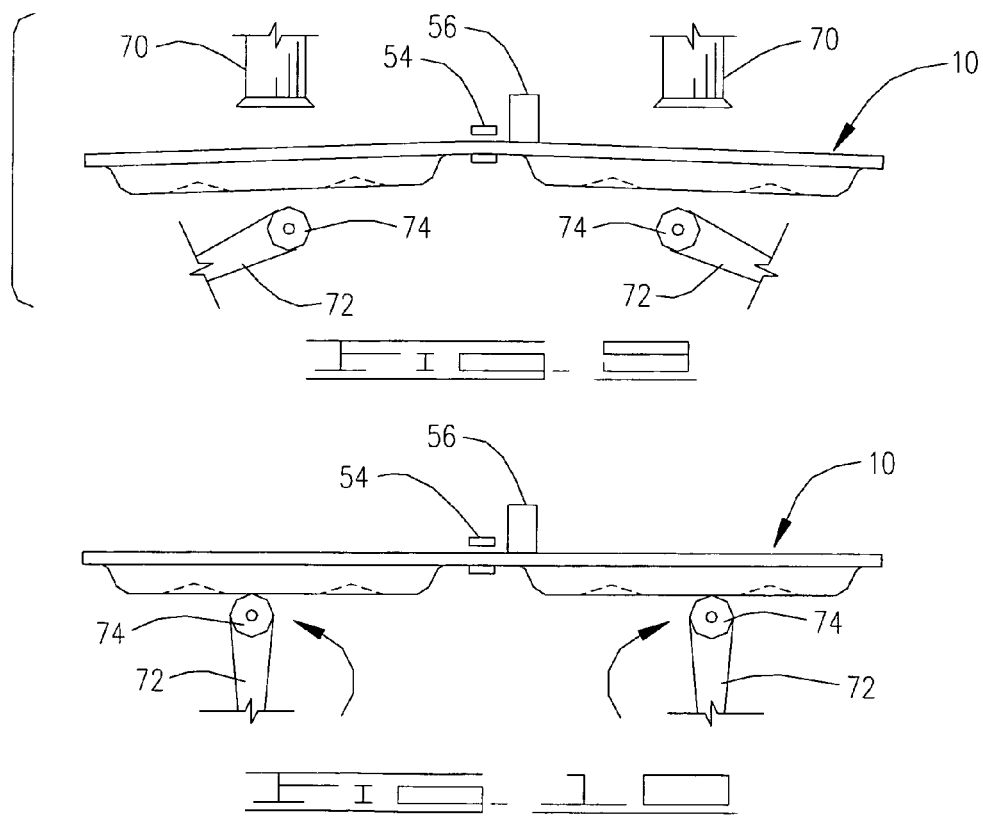

SINGULATOR FOR STACKED WORK PIECES

CROSS REFERENCE TO RELATED APPLICATIONS

This application claims the benefit of U.S. Provisional Application No. 60/337,268 filed Dec. 5, 2001.

FIELD OF THE INVENTION

This invention relates generally to the field of automated fabrication devices and more particularly without limitation to a device for singulating a work piece from a stack of the work pieces.

BACKGROUND OF THE INVENTION

Tremendous gains in manufacturing productivity and quality have been realized by the application of modem automation techniques to production processes. Most of the earliest advancements involved automating fabrication processes, such as numerically controlled tooling machines. Typically, the work piece was manually installed into a fixture, or "fixtured," the computer-controlled process performed, and then the work piece was manually removed from the fixture. Subsequent advancements improved the material handling aspects of the process, such as with the proliferation of robotics. Today, it's not unusual to see all aspects of the fabrication process from raw material to packaging performed by flexible manufacturing cells connected by material transfer devices.

Flexible manufacturing approaches are typically able to process different types of parts so that one cell can be used in the manufacture of different products. For example, a packaging cell might be able to receive different size containers for use in packaging different sizes or types of products. This flexibility furthermore aids the development of new and different products because the likelihood of consequential costly modifications and downtime to the manufacturing process are greatly diminished.

Some types of work pieces are characteristically more challenging to handle with automated processes. A thin and easily deformable sheet of material, for example, presents special challenges as compared to a rigid member when picking and placing such an object. For this reason, it is not unusual to see human assistance necessary in operations requiring singulating sheet material work pieces, such as lightweight thermoformed clamshell type packages. Such a requirement for manual intervention is all the more certain where different types or sizes of clamshell packages are processed, and where the packages are received and used in a stacked arrangement. The penalty associated with relying on manual intervention can be very significant.

It has been determined that singulating a work piece such as this can be automatically done reliably by gripping a medial portion thereof, unstacking the work piece, and then supporting the distal ends of the unstacked work piece. It is to these improvements and others as exemplified by the description and appended claims that embodiments of the present invention are directed.

SUMMARY OF THE INVENTION

The embodiments of the present invention contemplate an apparatus for singulating a first work piece from a plurality of stacked work pieces. The plurality of stacked work pieces comprises a second work piece adjacent the first work piece. A stripping member is engageable against the second work piece. A lifting member is engageable with the first work piece and displaceable with respect to the stripping member between first and second positions. In the lifting member first position the first and second work pieces are stacked; in the lifting member second position the first and second work pieces are unstacked. After unstacking, a supporting member is moveable to engage the unstacked first work piece, selectively supporting the first work piece in a preselected plane.

In an embodiment the stripping and lifting members are displaceable between a retracted mode and an engaged mode. In the retracted mode clearance is provided permitting moving the first work piece past the stripping and lifting members. In the engaged mode the stripping and lifting members are receivingly engaged within a gap between the first and second work pieces. In one embodiment a sensor indicates when the gap is aligned with the stripping and lifting members. Additionally, the plurality of stacked work pieces can be moved by an indexer device adaptively responsive to the sensor.

In an embodiment a clamping member cooperates with the lifting member in clamping the first work piece before engagement by the supporting member. The clamping member can be displaceable between a retracted mode and an engaged mode. The retracted mode clearingly permits moving the first work piece past the clamping member.

In an embodiment the supporting member articulates in moving to supportingly engage the first work piece. The supporting member can comprise a roller engageable against the first work piece.

The embodiments of the present invention contemplate a singulating apparatus comprising two or more opposing supporting members around the lifting member. Furthermore, the embodiments comprise two or more opposing lifting members engageable with respective portions of the first work piece, and comprising two or more opposing supporting members around each of the lifting members.

In an embodiment of the present invention the stripping member can be displaceable relative to the lifting member. Furthermore, the lifting member can engage a medial portion of the first work piece and the supporting member can subsequently engage a distal portion thereof.

One aspect of the embodiments of the present invention involves a singulator for stacked flexible work pieces, comprising a lifting member engageable against a medial portion of the uppermost work piece and moveable to displace the uppermost work piece from the stacked work pieces, and means for supporting a distal end of the displaced work piece relative to the medial portion substantially within a preselected plane.

One aspect of the embodiments of the present invention involves a method for singulating a first work piece from a plurality of stacked work pieces, the plurality of stacked work pieces comprising a second work piece adjacent the first work piece, comprising: imparting a stripping force to the plurality of stacked work pieces allowing a freedom of movement of the first work piece relative to the stacked work pieces; imparting a lifting force to the first work piece, displacing the first work piece from the plurality of stacked work pieces; and imparting a supporting force to the displaced first work piece, aligning the first work piece along a preselected plane. The lifting force can be imparted to a medial portion of the first work piece and the supporting force can be subsequently imparted to a distal end thereof.

A clamping force can be imparted to the first work piece before imparting the supporting force thereto.

These and various other features as well as advantages which characterize the present invention will be apparent upon reading of the following detailed description and review of the associated drawings.

BRIEF DESCRIPTION OF THE DRAWINGS

FIG. 8 is a diagrammatic illustration of a position sensor controlling the indexing of the stack of work pieces to the singulating apparatus.

FIG. 9 is an elevational view of the lifting and clamping members operatively clamping a medial portion of the work piece.

FIG. 10 is a view similar to FIG. 9 but wherein the supporting members are moved to operatively engage the distal portions of the work piece, adaptively supporting the work piece within a preselected plane.

DETAILED DESCRIPTION

Figure 1:
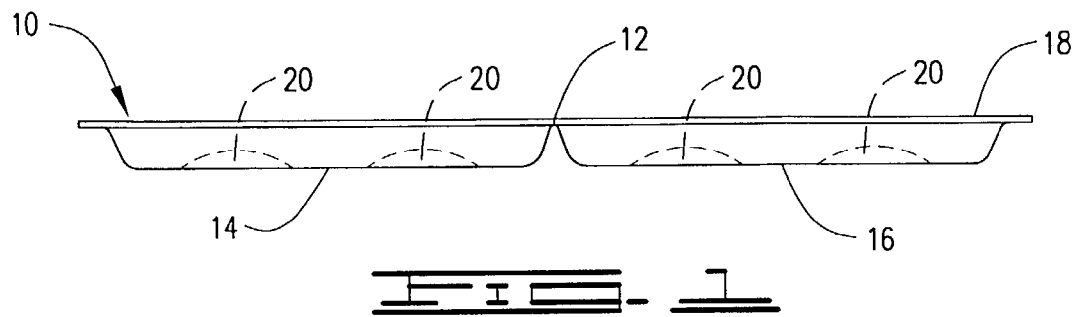
FIG. 1 is an elevational view of a work piece well suited for use with a singulator constructed in accordance with the present invention.

Referring to the drawings in general, and more particularly to FIG. 1, shown therein is an illustrative work piece 10 that is well suited for use with a singulator apparatus constructed in accordance with embodiments of the present invention. The work piece 10 generally can be characteristically lightweight and easily deformable, such as a thermoformed plastic sheet that is foldable to form a clamshell type package. A hinge 12 is defined in a medial portion such that the opposing halves 14, 16 are foldable toward each other to define an enclosure. A perimeter flange 18 is typically sealed or otherwise fastened to close the halves 14, 16 together. Ribs 20 can be formed for stiffness, or to abuttingly engage against the item within the enclosure.

Figure 2:
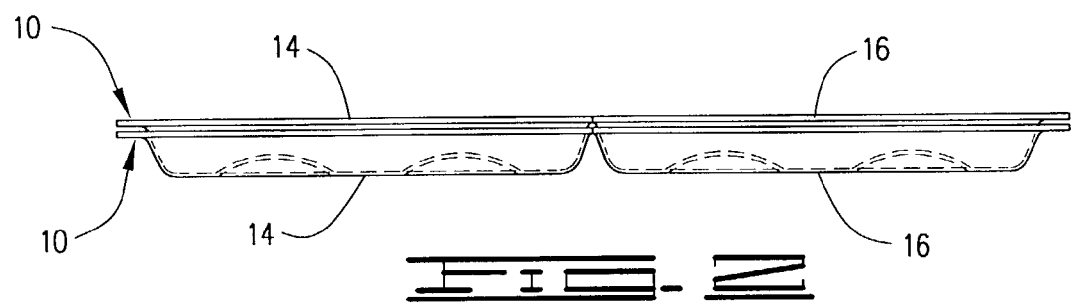
FIG. 2 is an elevational view of two work pieces similar to that of FIG. 1 in a stacked condition.

FIG. 2 is an elevational view of two work pieces 10 in a stacked and nested arrangement such as is used for bulk shipping. It will be noted the cup-shaped halves 14, 16 of the upper work piece 10, or "first work piece" 10, are nested within the corresponding cavities formed by the halves 14, 16 of the lower work piece 10, or "second work piece" 10. Embodiments of the present invention contemplate an apparatus and associated method for automatically singulating the first work piece 10 from a stack of work pieces. By "singulating" it is meant that an individual work piece is separated from the stack. Singulating can further mean selectively supporting the work piece for presentation to a downstream process such as a pick and place process comprising a transfer device.

Singulating a work piece 10 such as a thin-walled thermoformed sheet, as illustratively shown in FIGS. 1 and 2, can be problematic for a number of reasons. The work piece of FIGS. 1 and 2 is illustrative only and not exhaustive of the type of work pieces that are suited for use with the embodiments of the present invention. For example, the work piece 10 is generally illustrative of a work piece that is inherently easily deformable. The work piece 10 is easily deformable for at least a couple of reasons; first, due to the small thickness of the material, and second, due to the hinge portion 12. The embodiments of the present invention are not limited to use with work pieces comprising both features, and may be useful for work pieces that are easily deformable for other reasons such as due to a material characteristic.

Typically, the singulated work piece will need to be selectively positioned so as to be receivingly engageable with a pick and place transfer device. That is, for example, gripping members of a transfer device must engage the singulated work piece at a preselected reference position so as to permit the necessary gripping engagement. Where suction cup lifters are used then the suction cups must engage the singulated work piece at a preselected reference position so as to permit the necessary sealing engagement.

Figure 3:
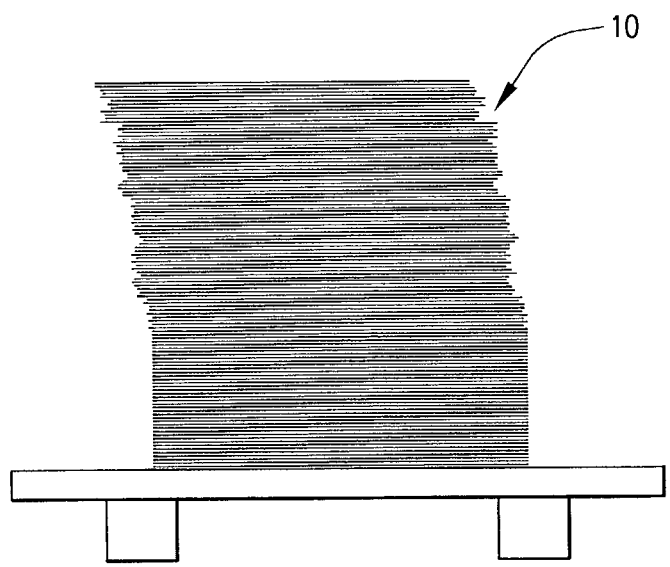
FIG. 3 is an elevational view of a skewed stack of the work pieces of FIG. 2.

Accordingly, where an easily deformable work piece is singulated then one potential difficulty lies in how to present the singulated work piece appropriately for downstream operations such as picking and placing operations. To present the singulated work piece squarely it is advantageous to engage the first work piece at distal end portions thereof. But another potential difficulty lies in the fact that the work pieces are stacked, not positively located within a part tray. The amount of nesting between adjacent work pieces can be somewhat random, resulting in skewing of the stack as illustrated in FIG. 3. Therefore, to engage the work piece to be singulated it is advantageous to engage it at a medial portion thereof, leaving the distal ends free to move after the work piece is singulated.

Figure 4:
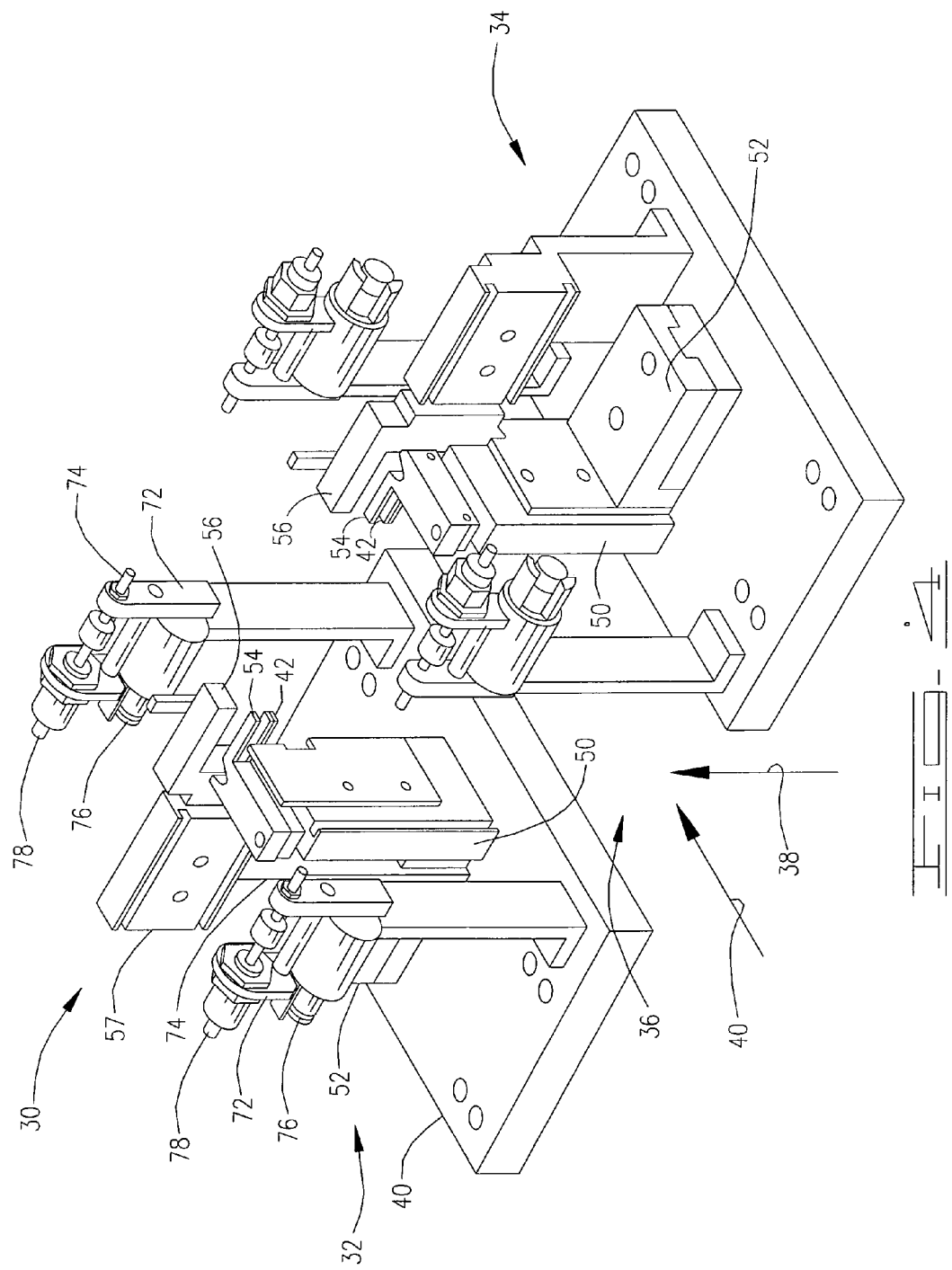
FIG. 4 is an isometric view of a singulator apparatus constructed in accordance with embodiments of the present invention.

FIG. 4 is an isometric view of a singulating apparatus 30 constructed in accordance with embodiments of the present invention and useful in overcoming the inherent difficulties associated with singulating stacked work pieces. The singulating apparatus 30 illustrated by FIG. 4 and described hereinbelow utilizes a pair of opposing singulating assemblies 32, 34 defining a gap 36 therebetween through which the stack of work pieces 10 passes for singulating. The embodiments contemplated by the present invention are not limited to the use of such a pair of opposing singulating assemblies 32, 34; alternatively, the invention described and claimed herein contemplates utilizing only one singulating assembly (32 or 34) where the work piece is conducive to manipulation therewith. The embodiment described herein represents the more difficult situation wherein the work piece inherently requires engagement on opposing sides thereof for singulating. For purposes of the description herebelow, reference is made to the singulating assembly 32 and it will be recognized that the opposing singulating assembly 34 substantially operates in mirror fashion thereto.

Preferably, the stack of work pieces is moved substantially in direction 38 and indexed appropriately such as by an elevator mechanism or a scissor lift or the like. Alternatively, the stack can be moved in any direction such as a lateral direction 40, as described more fully below.

Figure 5:
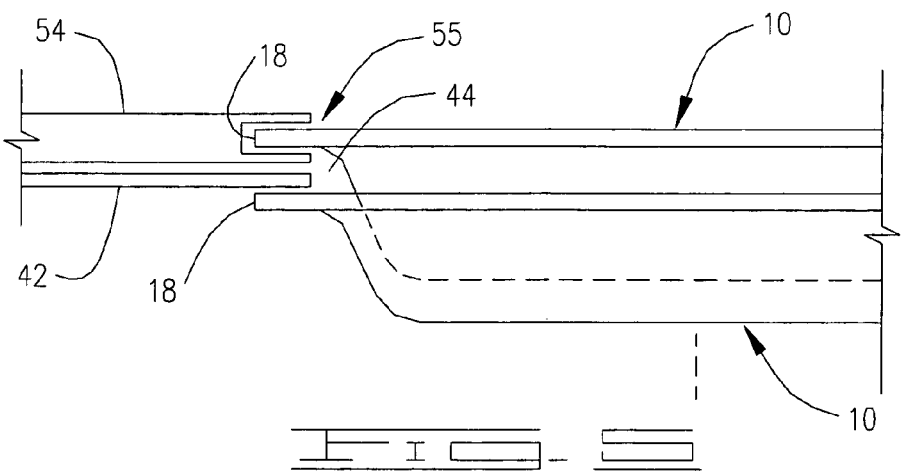
FIG. 5 is an elevational view of the stripping and lifting members in the engaged mode.

The singulating assembly 32 singulates the first work piece 10 from the plurality of stacked work pieces. The singulating assembly 32 comprises a supporting base 40 supporting a stripping member 42 that is engageable against the second work piece. Generally, the stripping member 42 is engageable against any convenient support surface of the second work piece that is rigid enough to hold back the stack of work pieces while the first work piece is unstacked therefrom. For illustration, the embodiments depicted in the drawings herein utilize the flange 18 as an engagement surface. Accordingly, FIG. 5 illustrates the stripping member 42 receivingly engaged within a gap 44 defined between the flanges 18 of the first and second work pieces 10. As the first work piece is unstacked, the stripping member 42 abuttingly engages the flange 18 of the second work piece, preventing movement of the second work piece 10 in the displacement direction of the first work piece.

Figure 6:
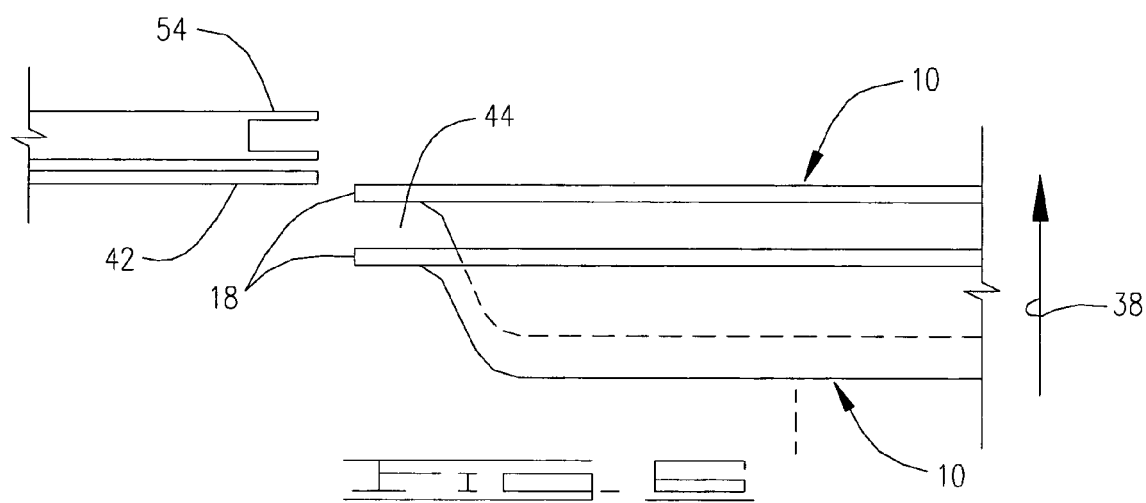
FIG. 6. is a view similar to FIG. 5 but wherein the stripping and lifting members are in the retracted mode.

As discussed previously, preferably the stack of work pieces is moved substantially in direction 38 (FIG. 1), or transversely to the stripping member 42. Accordingly, the stripping member 42 can be displaceable between an engaged mode and a retracted mode. In the engaged mode as shown in FIG. 5 the stripping member 42 is receivingly engage in the gap 44. In the retracted mode, as shown in FIG. 6, the stripping member 42 clearingly permits moving the flange 18 past the first member 42 in direction 38. In order to move the stripping member 42 between the retracted and engaged mode the stripping member 42 can be supported by a plate member 50 that is supported, in turn, by a linear actuator device 52 such as but without limitation a rodless fluid cylinder device.

The singulating apparatus 32 further comprises a lifting member 54 that cooperates with the stripping member 42 to unstack the first work piece 10. The second member 54 can be moveable substantially in unison with the stripping member 42 between the engaged and the retracted modes, as shown in FIGS. 5 and 6, respectively.

Figure 7:
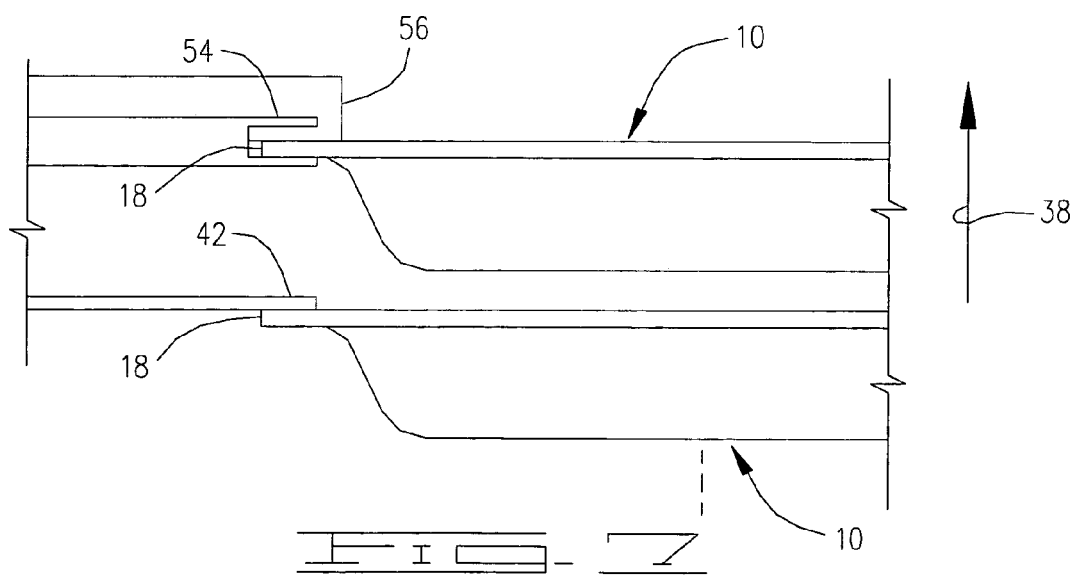
FIG. 7 is a view similar to FIG. 5 but wherein the lifting member is displaced relative to the stripping member to unstack the first work piece.

Comparison of FIGS. 5 and 7 illustrate that in the engaged mode the lifting member 54 can be furthermore displaceable relative to the stripping member 42 to displace the first work piece, thereby unstacking the first work piece. Generally, the lifting member 54 is engageable against any convenient support surface of the second work piece that is rigid enough to support the first work piece during unstacking. For illustration, the embodiments depicted in the drawings herein utilize the flange 18 as an engagement surface. Accordingly, FIG. 7 illustrates the lifting member 54 abuttingly engaged against the flange 18 of the first work piece 10.

To positively grip the first work piece 10 a clamping member 56 can be located in the path of lifting member 54 travel, such that the first work piece is positively clamped between the lifting member 54 and the clamping member 56 as shown in FIG. 7. Like the stripping member 42 and the lifting member 54, the clamping member 56 can be retractable between an engaged mode, shown in FIG. 7, and a retracted mode (not shown) whereat the unstacked work piece 10 can be transferred away from the singulating apparatus 32 in direction 38. The clamping member 56 can be moved independently of the stripping member 42 and lifting member 54, as discussed below, by a linear actuator 57 (FIG. 4) such as but not limited to a rodless fluid cylinder.

Because the stacked work pieces are not precisely located for input to the singulating apparatus 32, preferably there is a provision for automatically indexing the stack. For example, FIG. 8 is a diagrammatic illustration of the clamping member 56 in the extended mode while the stack of work pieces 10 is being indexed in direction 38. The clamping member 56 supports a sensor 58 capable of detecting the incremental position of the first work piece 10. The sensor 58 can be, for example, an adjustable proximity sensor. The sensor 58 senses a signal 60 to a control 62 to indicate when the first work piece 10 is at a preselected position. The control 62 sends a responsive signal 64 to an indexer 66 which controls the movement of the stack of work pieces 10. In this case, for example, the sensor 58 can be set to indicate when the gap 44 is aligned with the stripping member 42 and the lifting member 54.

Turning now to FIG. 9 which diagrammatically illustrates the first work piece 10 unstacked and clamped between the lifting member 54 and the clamping member 56. Because the work piece 10 is not rigid the distal ends slope downwardly from the medial clamped portion. This can be an undesirable arrangement where a pick and place transfer device must engage the work piece at a reference position. For example, a transfer device comprising a suction cup end effector 70 is shown, which travels downward and engages the work piece along a preselected plane of engagement.

Comparison of FIGS. 9 and 10 illustrate the manner in which one or more supporting members 72 are moveable to engage the unstacked work piece, thereby supporting the unstacked work piece in a preselected plane. In the embodiment depicted by the drawings the supporting members 72 articulate in moving to supportingly engage the unstacked work piece 10. The supporting member 72 can comprises a roller 74 journalled to a distal end thereof and rollingly engageable against the work piece 10.

Returning to FIG. 4 it will be noted that one embodiment provides an articulating support member 72 that is selectively rotated by a rotary positioner 76. The roller 74 can be selectively moved between an engaged and a retracted position by a solenoid 78. By retracting the roller 74, like the stripping member 42, lifting member 54 and clamping member 56, the first work piece 10 can be indexed past the roller 74 in moving along direction 38.

In an alternative embodiment (not shown) the work piece 10 can be indexed substantially in lateral direction 40, thereby eliminating the need to retract the stripping member 42, lifting member 54, clamping member 56 and contacting portion of the supporting member 72. Furthermore, in alternative embodiments the stripping member 42 can be displaceable relative to the lifting member while unstacking the work piece 10.

It will be noted that the embodiments of the present invention are well adapted to the tenets of flexible manufacturing. By lifting and clamping the singulated part in a medial portion thereof, work pieces of different lengths can be accommodated without tooling changeovers or other modifications to the setup.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the mechanisms used to move the stripping, lifting, clamping and supporting members may vary while maintaining substantially the same functionality without departing from the scope and spirit of the present invention. In addition, although the preferred embodiment described herein is directed to use with a thermoformed clamshell package work piece, it will be appreciated by those skilled in the art that the teachings of the present invention can be applied to other work pieces as well without departing from the scope and spirit of the present invention.

What is claimed is:

1. An apparatus for singulating a first work piece from an adjacent second workpiece in a plurality of stacked work pieces, comprising:
   a stripping member engageable against the second work piece;
   a lifting member engageable with the first work piece and displaceable with respect to the stripping member between first and second positions, wherein the first and second work pieces are stacked in the first position and the first and second work pieces are unstacked in the second position, and wherein the stripping member and the lifting member are interposed between the first and second workpieces in both the first and second positions; and
   a clamping member cooperating with the lifting member in clamping the first work piece.

2. The apparatus of claim 1 wherein the stripping and lifting members are displaceable between a retracted mode and an engaged mode, the retracted mode clearingly permitting moving the first work piece past the stripping and lifting members, the engaged mode interposing the stripping and lifting members in a gap between the first and second work pieces.

3. The apparatus of claim 2 further comprising a sensor indicating when the gap is operatively aligned with the stripping and lifting members.

4. The apparatus of claim 3 wherein the plurality of stacked work pieces is moved by an indexer device adaptively responsive to the sensor.

5. The apparatus of claim 1 wherein the lifting member engages a medial portion of the first work piece.

6. The apparatus of claim 1 wherein the clamping member is displaceable between a retracted mode and an engaged mode, the retracted mode permitting moving the first work piece past the clamping member.

7. The apparatus of claim 1 further comprising a supporting member which articulates in moving to supportingly engage the first work piece while the lifting member is in the second position.

8. The apparatus of claim 7 wherein the supporting member comprises a roller engageable against the first work piece.

9. The apparatus of claim 1 further comprising two or more opposing supporting members moveable to engage respective distal portions of the first work piece while the lifting member is in the second position.

10. The apparatus of claim 1 wherein the stripping member and the lifting member are respectively characterized as a first stripping member and a first lifting member, and wherein the apparatus further comprises a second stripping member and a second lifting member disposed opposite the workpiece from the first stripping member and the first lifting member, the second lifting member moveable with respect to the second stripping member between said first and second positions, and the second stripping member and the second lifting member interposed between the first and second workpieces in both said first and second positions.

11. An apparatus for singulating a first work piece from an adjacent second workpiece in a plurality of stacked work pieces, comprising:
   first means for imparting a stripping force to the second work piece to allow a freedom of movement of the first work piece relative to the second work piece; and
   second means for imparting a lifting force to the first work piece to displace the first work piece from the second work piece, wherein the stripping force and the lifting force are both applied between the first and second work pieces; and
   third means for imparting a supporting force to the displaced first work piece to align the first work piece along a preselected plane.

12. The apparatus of claim 11, wherein the first means comprises a stripping member insertable between the first and second work pieces and engageable against the second work piece.

13. The apparatus of claim 12, wherein the second means comprises a lifting member insertable between the first and second work pieces, engageable with the first work piece and displaceable with respect to the stripping member between first and second positions, wherein the first, and second work pieces are stacked in the first position and the first and second work pieces are unstacked in the second position.

* * * * *